Nov. 29, 1949 P. KRATZER 2,489,904
APPARATUS FOR ADJUSTING THE PLANE OF THE CLAMPING
ELEMENTS OF HYDRAULIC TESTING MACHINES
Filed July 9, 1945 3 Sheets-Sheet 1
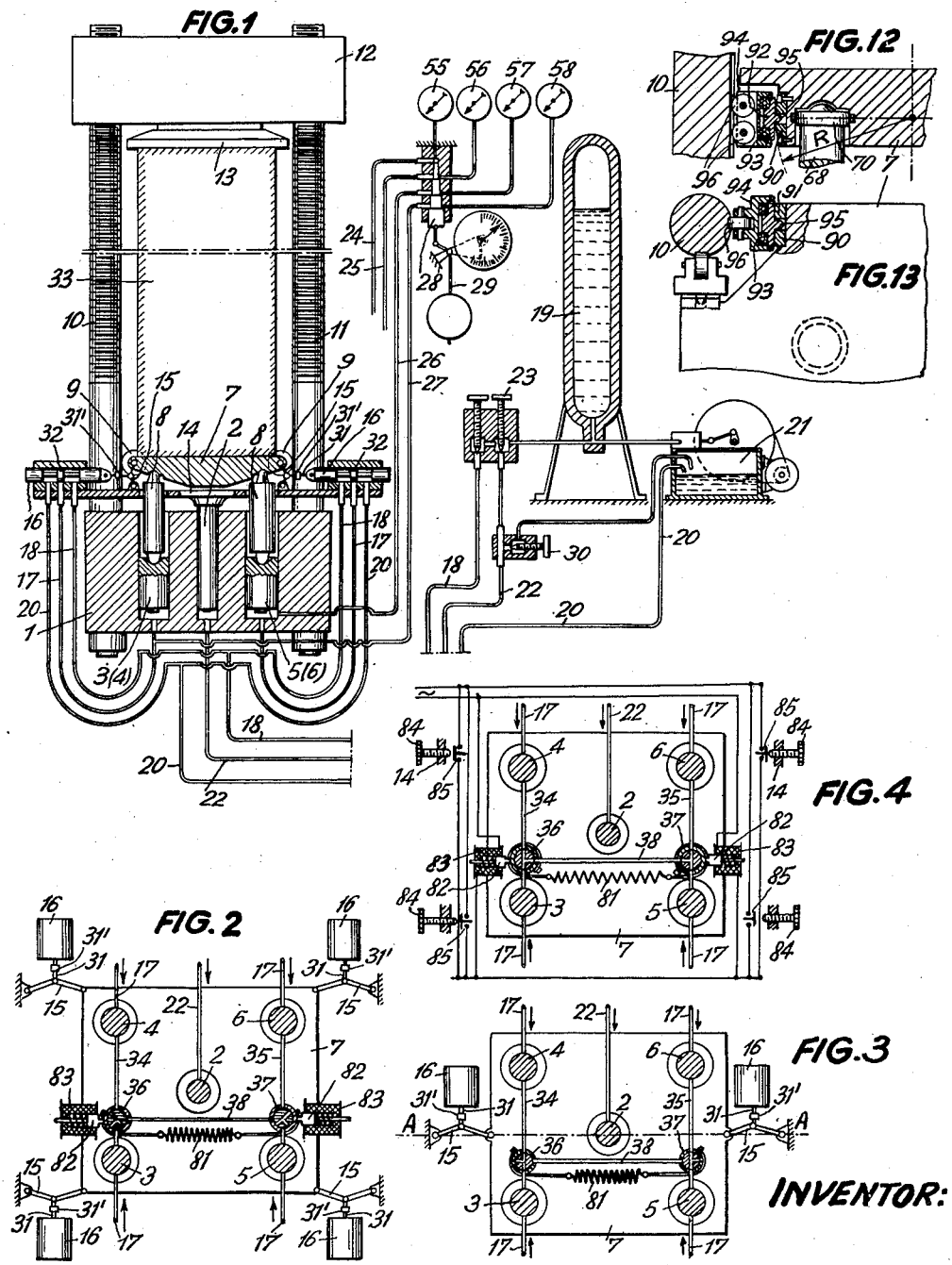
INVENTOR:
Paul Kratzer
by Sommers & Young
Attorneys

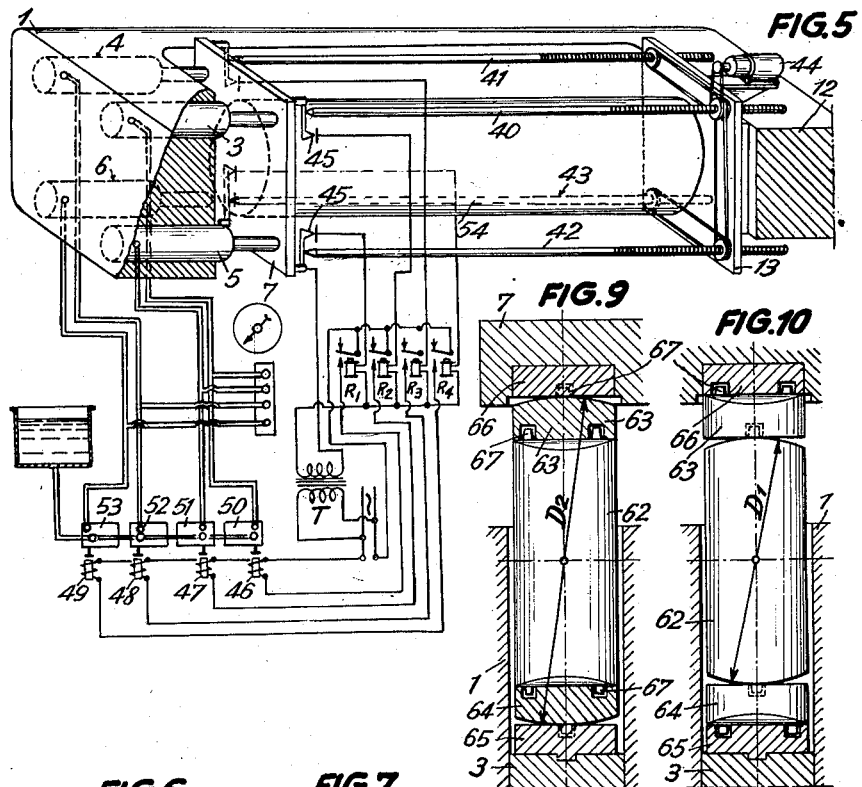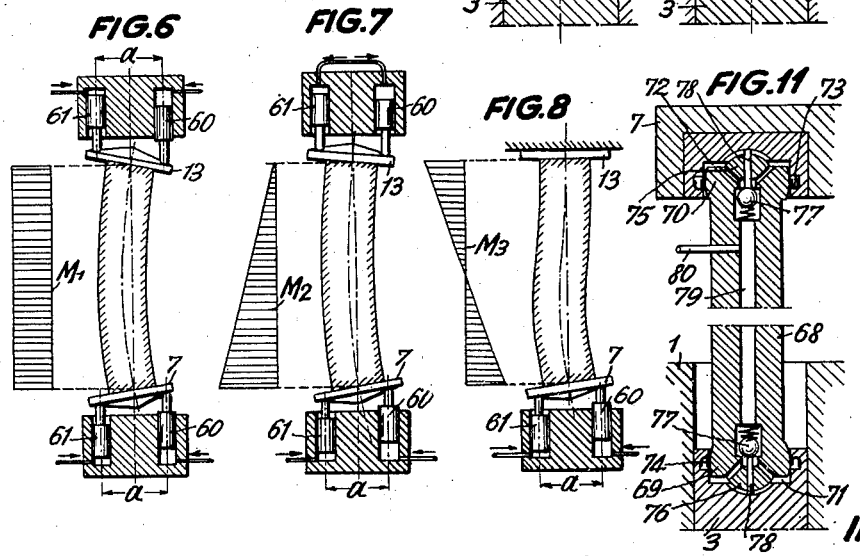

Nov. 29, 1949 P. KRATZER 2,489,904
APPARATUS FOR ADJUSTING THE PLANE OF THE CLAMPING
ELEMENTS OF HYDRAULIC TESTING MACHINES
Filed July 9, 1945 3 Sheets-Sheet 3
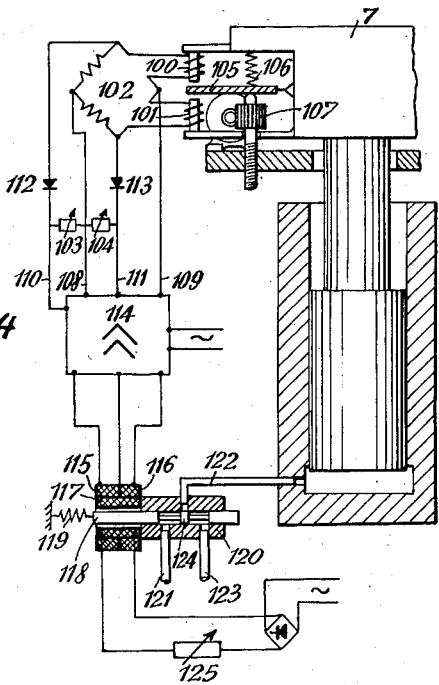
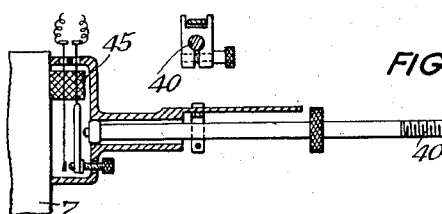
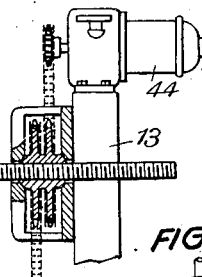
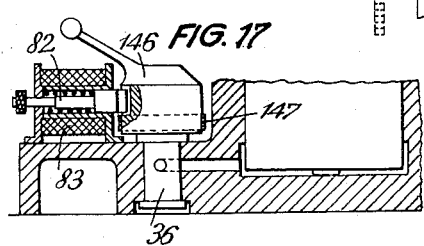
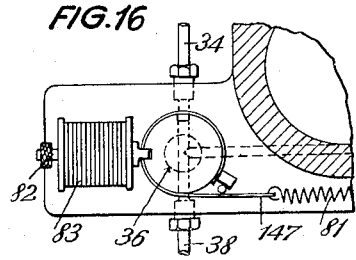
INVENTOR:
Paul Kratzer
by Sommers+Young
Attorneys Patented Nov. 29, 1949

2,489,904

UNITED STATES PATENT OFFICE 2,489,904

APPARATUS FOR ADJUSTING THE PLANE OF THE CLAMPING ELEMENTS OF HYDRAULIC TESTING MACHINES

Paul Kratzer, Schaffhouse, Switzerland, assignor to Alfred J. Amsler & Co., Schaffhouse, Switzerland Application July 9, 1945, Serial No. 603,838
In Switzerland September 16, 1944

5 Claims. (Cl. 73—94)

This invention relates to apparatus for adjusting the plane of clamping engagement of the clamping elements of hydraulically operated testing machines.

In the line of testing of materials it has come in vogue in the late past to use gigantesque testing machines which permit of subjecting to very great loads (1000 to 3000 tons) entire structures, such as frame works, welded structures, air craft fuselages or so-called linings for the latter and to measure the interior stresses thus set up in the material as well as the distribution of said stresses throughout the material of the test piece.

In the hitherto known machines the weakest part of the test piece yields to a critical loading having been reached so that from thereon the conditions of stressing interiorly of the test piece become vague for the reason that the clamping elements tend to follow the deformation of the test piece. Under these circumstances the testing must in most cases be interrupted or the result obtained by the testing fails to come up to expectations.

In consequence thereof, testing machines have been called for, particularly by institutions for the testing of materials, by means of which it is possible to deform test pieces in the direction of their longitudinal axis and uniformly over all the cross sectional area of the test piece. This result must be obtained in every case even after the partial breaking down of the test piece and the consequent shifting of the load distribution relative to the axis of the machine. This kind of testing serves the purpose of appropriately ascertaining the percentages which the various constituent parts contribute to the total carrying capacity of the structure.

This testing method requires that the engagement faces of the clamping elements maintain their positions relative to the direction of movement thereof precisely during the whole travel of deformation irrespective of whether the point of application of the testing load shifts relative to the axis of the machine.

It will be readily recognized that the testing machines of conventional construction do not come up to such requirements on testing, for the reason that the known mechanical guide means for the clamping elements as well as the machine frame are, due to shifting of the point of application of the load, subjected to deformations which would require the clamping elements to change their positions to an undue extent.

With machines with hydraulic thrust measuring means it is for reasons of measuring purposes inappropriate to use the machine plunger of conventional design as a guide means. In most cases such machines must serve for making buckling tests also, namely in the conditions as known by the cases 2 to 4 established by Euler. For this purpose the clamping elements must be capable to move in the following manners

| Cases as established by Euler | Movability of the Individual Clamping Element required |
|---|---|
| 2 | Both clamping elements can incline in all directions (centering point bearing engagement); |
| 3 | One clamping element is rigidly guided whereas the other has centering point bearing engagement; |
| 4 | Both clamping elements are rigidly guided. |

A modified form of case 2 consists in employing what may be termed knife edge bearing engagement of the clamping elements, that is, the latter must be capable of inclining round a horizontal axis, thereby to compel the test piece to yield by buckling in a direction at right angles to said axis. In all buckling tests the movements of the clamping elements must be free from friction so as to render the results obtained perfectly reliable. The buckling test devices used are assumed to be of known construction throughout and need, therefore, not be explained in detail. Said buckling devices are in most cases mounted on the normal clamping elements of the testing machine in the manner as usual for accessories and are, apart from being inappropriately constructed deficient also from the point of view of technical test measuring. Further drawbacks consist in wieldiness and heaviness and the mounting and dismounting of said accessories on and from the testing machine is thus more or less tedious and the carrying capacity thereof is generally limited.

The present invention relates to apparatus for adjusting the plane of clamping engagement of the clamping elements of hydraulically operated testing machines, in which the above-mentioned drawbacks are eliminated and which comes up to all requirements put on testing in perfect and convenient manner.

According to the present invention, this is accomplished by guiding at least one of the clamping elements transversely of its direction of movement and supporting said element from at least three pressure plungers through the intermediary of freely movable thrust transmission means and by providing automatically operating control devices for controlling the supply of pressure medium to the plungers, in such manner, that the plane of clamping of the clamping element concerned inclines in a direction which corresponds with the test being made irrespective of whether the loading is applied symmetrically or asymmetrically to the main axis of the testing machine.

Embodiments of the present invention are illustrated, by way of example only, in the accompanying drawings in which Fig. 1 is a schematic view of a first exemplification representing a machine for making compressive tests and buckling means comprising apparatus for adjusting the plane of clamping of a lower clamping element;

Fig. 2 is a schematic top plan view of the rigidly guided press plate inclusive of the pressure plungers and control devices being developed into a horizontal plane for purposes of illustration;

Fig. 3 is a schematic plan view of the same press plate but arranged for knife edge mounting;

Fig. 4 is a like view of the press plate but arranged for centering point bearing engagement;

Fig. 5 is a schematic illustration of a press representing a second exemplification including control devices having electrical contact arrangements;

Figs. 6, 7 and 8 illustrate different modes of testing by means of press plates that are controlled as prescribed;

Figs. 9 and 10 show two vertical sections taken at right angles to each other through an exemplification of a thrust transmission means for connecting the pressure plunger with the press plate;

Fig. 11 shows a vertical section of a further exemplification of a thrust transmission means of this kind;

Figs. 12 and 13 show a vertical and a horizontal section respectively of a guide for the press plate;

Fig. 14 shows schematically electric control means operating on the inductive principle;

Fig. 15 shows a section of a control element with electrical contact arrangements to determine the inclination of two clamping elements in accordance with the progress of the test to be carried out;

Figs. 16 and 17 are plan and a section side view respectively of control means to limit the inclination of the press plate, Fig. 16 showing the cock-valve in position for centering point bearing engagement, and Figs. 18 and 19 are schematic plan views of the cock-valves for knife edge bearing mounting and rigid mounting respectively.

The testing machine for compressive tests shown in Fig. 1 corresponds as regards the general design with the conventional practice of building heavy testing machines. The cylinder block 1 accommodates by way of example five plungers, as shown in the plane views 2 to 4, so that the central plunger 2 is situated in the main axis of the machine and that the pressure plungers 3, 4, 5 and 6 are distributed thereabout in symmetrical manner and in each corner of the lower press plate 7 constituting a clamping element for the test piece 33. The press plate 7 is supported from each pressure plunger 3, 4, 5 and 6 by means of thrust transmission means 8 which act during the test substantially free from friction. This functioning will be hereinafter described with reference to Figs. 9, 10 and 11. The press plate 7 is guided in the horizontal direction by means of wheels 9 tracking on screw posts 10, 11 so as to permit of wheeling the crosshead 12 up and down respectively for altering the height of the testing space.

For the purpose of simplifying the illustration in Fig. 1 the upper press plate 13 is rigidly connected to the crosshead 12. Dependent upon the conditions of testing this plate can be supported exactly like the lower press plate 7, precaution being taken to prevent it from falling out of position by gravity action. In order to come up to the requirement that the bearing surface of the press plate must remain perpendicular to its rising movement at all times it is necessary that each pressure plunger 3, 4, 5 and 6 has a predetermined rising speed imparted thereto irrespective of the proportions in which said plungers share in carrying the load. To this end it is necessary to control the oil supply to each plunger and to establish a reference line for the control members.

This is accomplished by rigidly connecting to the central plunger 2 a reference plate 14 the plane of which extends at all times perpendicularly to the direction of movement of this plunger. Each corner of the rectangular plate 7, which in this case is rectangular, is connected with the reference plate 14 by means of toggle levers 15. These toggle levers 15 having a great multiplying ratio transmit by means of a rodwork 31 the relative movement between the press plate and the reference plate to a control slide valve 16. The rodwork 31 is provided with a nut 31' which is equipped with a right hand and a left hand screw thread so that by turning this nut the length of said rodwork can be changed.

The casings of the control slide valves 16 communicate with the pressure spaces of the plungers 3, 5 and 4, 6 respectively through pipes 17, whereas pipes 18 communicate with an air-cushioned pressure oil reservoir 19, and pipes 20 establish communication between the control slide valves 16 and the oil tank of a pump 21. The central plunger 2 is connected by a pipe 22 with the pressure oil reservoir 19. In the latter a much greater pressure exists than that acting upon the lower end faces of the plungers 3, 4, 5, 6 and the adjusting plunger 2. By means of a control valve 23 the plunger 2 can be raised at any required velocity.

The liquid pressures, as setting up in the individual plungers and being likely to vary in dependence upon the load distribution as caused to act upon the press plate by the test piece, are transmitted through the pipes 24, 25, 26 and 27 to the stepped measuring plunger 28. This plunger adds the individual pressures to each other and transmits the sum to a dynamometer which in this instance may consist in a clinometer 29. A relieving valve 30 initiates the return movement of the central plunger 2 after the valve 23 is closed.

The operation of the control device of the testing machine is as follows:

As the central plunger 2 and the four pressure plungers 3, 4, 5, 6 bear against the bottoms of the respective cylinders, the rodworks 31 are readjusted by turning the nuts 31', in such manner, that the slide valve portions 32 shut the casing port opening communicating with the pipe 17. Therefore, no pressure oil can flow through the pipes 17 underneath the lower faces of the plungers 3, 4, 5 and 6 nor can such oil escape from the cylinders through the pipes 20 into the oil tank of the pump 21. On opening of the valve 23 the plunger 2 rises and the rodwork 31 and the control slide valves 16 move outwardly so that communication between the pipes 17 and 18 is established and the plungers 3, 4, 5 and 6 are set in rising motion.

The more the velocity of the plungers 2 increases the more pressure oil flows into the pipe 17 and the supply of oil ceases when the plunger 2 reassumes velocity zero, provided that the pressure plungers 3, 4, 5 and 6 have risen equal amounts. If, however, either one of the four plungers 3, 4, 5, 6 leads or lags, for example, due to eccentric loading of the test piece 33, the control operations immediately precedingly described take place. The plunger 2 for controlling the reference plate 14 serves for establishing a basis for measuring the velocity of rising and the position of the pressure plate 7. If the surface of the test piece which bears on the pressure plate 7 is not perpendicular to the longitudinal axis of this piece, it is necessary to adjust the rodworks 31 in such manner that the pressure plate 7 inclines conforming to the inclination of said surface. The pressure plate 7 then remains in the position of adjustment during the whole time of testing. The control operation as described is in accord with the mode of testing by means of a fixedly mounted press plate and thus with the case 4 as established by Euler.

The arrangement of the piping and of the control slide valves is schematically illustrated in Fig. 2. In order to facilitate the understanding of these arrangements they are shown to be developed in a horizontal plane. With each plunger is associated an individual pressure supply pipe. The connecting pipes 34, 35 and 38 which are arranged between the cylinders of the pressure plungers 3, 4, 5 and 6 are throttled by means of cock valves 36, 37.

In Fig. 3 a knife blade mounting arrangement is shown which includes a pressure plate which is pivotally mounted about an axis A—A. In order to obtain such a knife blade mounting the cock valves 36 and 37 are adjusted that the cylinders of the plungers 3 and 4 are connected with each other through a branch pipe 34 and the cylinders of the pressure plungers 5 and 6 through a branch pipe 35. The plungers thus function in pairs due to the connecting pipe 38 being throttled. The toggle levers 15 and the control slide valves 16 lie in the pivot axis A—A. Pivoting about another axis is therefore impossible.

In Fig. 4 a centering point bearing arrangement is shown in which the press plate 7 is perfectly free to incline in any direction as regards the direction of movement so that case 2 as established by Euler is obtained. The cock valves 36, 37 are so adjusted that communication between all the cylinders of the pressure plungers is established so that the pressure plungers can follow each inclining movement of the press plate without the pressure conditions among the individual cylinders changing. Therefore, the test piece can freely buckle in every direction.

In making compressive tests as illustrated in Figs. 3 and 4 care must be taken to avoid, for reasons of stability, that the angle of inclination of the pressure plate 7 becomes excessive. For this purpose the cock valves 36, 37 are associated with a retractile spring 81 and are arrested in position by means of an arresting means cooperative with a spring catch 82 forming a part of the core of an electromagnet 83. To the reference plate 14 angle irons carrying adjusting screws 84 are secured which cooperate with contact members 85. On the press plate 7 reaching its predetermined maximum inclination one of the contact members 85 is connected in circuit, whereby the electromagnets 83 attract their cores, so that the spring catches 82 are retracted from engagement with the arresting means. The cocks then turn automatically back into their initial positions by action of the spring 81, thereby to interrupt the afflux of oil to the pressure plungers through the connecting conduits 34, 35 and 38 so that further tilting of the press plate 7 is avoided, that is, this plate is returned into initial position.

Figs. 16 and 17 show schematically how the grip 146 of the cock valve 36 is attached to the spring 81 by means of a steel ban 147 and how the arresting means is provided on the grip.

In Fig. 5 an exemplification of the present invention is shown in which parallelism between two press plates 7 and 13 is compulsorily effected during the whole time of the test entirely irrespective of whether the test load is uniformly distributed to the four pressure plungers 3, 4, 5 and 6 or not or whether the machine frame undergoes elastic deformations which have the effect to change the position of the press plate 13. The plate 13 is firmly connected to the cross head 12 of the machine frame and serves as a reference means for the control device which in this arrangement cooperates with electric contact members and controls a pressure generating appurtenance which operates through the medium of pumps only.

Four control screws 40, 41, 42 and 43 are synchronously displaced by an electric motor 44, the speed of which can be controlled by known means, not herein shown or described, in adaptation to the desired velocity of testing. The press plate 7 is provided at each corner with a contact member 45 which members are thus four in number. These contact members are connected with a source of electric current via electromagnets 46, 47, 48 and 49 and a conventional electric relay system schematically shown in Fig. 5 and serving the purpose of transforming feeble switching impulses into strong switching impulses through the intermediary of an iron core transformer T and four A. C. Relays $R_1$, $R_2$, $R_3$ and $R_4$. Said electromagnets actuate the suction valves of pumps 50, 51, 52 and 53 respectively so that when the respective circuits are closed the associated pumps operate to deliver and that the delivery ceases when the corresponding circuit is broken.

In this arrangement as shown in Fig. 5 with each of the four pressure plungers 3, 4 and 5, 6 a pump is associated. The control operation takes such a course that after the pressure plates 7 and 13 have joined closely with the test piece 54 in a snug fit the control screws 40, 41, 42 and 43 are moved into engagement with the respective contact members so that the four circuits and thus the deliveries of the pumps are interrupted. When the electric motor 44 is connected in circuit the control screws recede from the respective contact members, whereupon these make contact for supplying current and consequently initiate the delivery of pressure oil to the cylinders. By alternately initiating and interruping the circulation of magnetic flux the pressure plate 7 follows the movements of the four control screws and remains parallel with the press plate 13 while moving towards the latter.

Further appreciable testing possibilities exist by influencing the slide valves 16, that is, the control screws 40, 41, 42 and 43 respectively, while the test is still in progress after certain prescriptions, in such manner, that some of the pressure plungers lead on the others. By this means the test piece can be subjected not only to compressive or bending stresses but also to compressive stresses in combination with additional bending stresses. Such possibilities are illustrated in Figs. 6, 7 and 8. If the thrusts exerted by the individual pressure plungers are measured by means of pressure gauges 55, 56, 57 and 58 respectively (Fig. 1) the product obtained by multiplying the difference of the plunger thrusts with the respective distances $a$ determines the bending moment, whereas the sum of the plunger thrusts indicates the compressive loading of the test piece.

In Fig. 6 the way of obtaining a constant bending moment along the axis of the test piece is illustrated in the diagram $M_1$. The lower press plate 7 and the upper press plate 13 are synchronously controlled so that the pressure plungers 60 lead on the pressure plungers 61 equal amounts. Fig. 7 shows the resulting bending moment of a beam which is rigidly clamped fast on one side and freely adjustably arranged on the other side in accordance with the diagram of moments $M_2$. The upper pressure plate 13 has centering point bearing engagement, whereas the lower pressure plate is controlled as prescribed.

Fig. 8 represents a bending moment diagram $M_3$ which changes its sign. The upper pressure plate 13 is rigidly mounted, whereas the lower pressure plate 7 is controlled as prescribed so that the pressure plungers 60 lead on the pressure plungers 61. The transverse forces setting up in the course of the tests as illustrated in Figs. 6, 7 and 8 must be resisted by the machine.

The mode of controlling of the clamping elements of a testing machine is advantageously chosen in dependence upon the sentitiveness to be obtained. If testing machines are concerned by means of which only conventional tests are to be carried out simpler elements are used, for example, control slide valves or contact members. Greater accuracy can be obtained, for example, by means of low pressure slide valves actuated directly by the press plate 7 and the reference plate 14, said low pressure slide valves controlling the supply of low pressure fluid to a hydraulic servo-motor, which controls in turn the supply of high pressure fluid to the pressure plungers of the testing machine. The low pressure fluid is in this case supplied by a separate low pressure pump. Again, by substituting cone or ball valves for the control slide valves the sensitiveness can be further increased.

Still greater sensitiveness can be obtained, for example, by inductively exploring the press plate movements. This is illustrated in Fig. 16.

The two electromagnets 100 and 101 represent parts of a Wheatstone bridge 102 and are rigidly connected to the press plate 7. The resistors 103 and 104 serve to equilibrate the bridge. Between the cores of the magnets 100 and 101 a steel tongue is provided, this steel tongue 105 has free angular movement and is fastened to the press plate 7. Spring 106 insures the contact of the steel tongue with the adjusting screw 107 to be constant, said adjusting screw being fastened to the reference plate 14.

Current is fed to the bridge through conductors 108 and 109.

If between the clamping element 7 and the reference plate, displacements occur, a steel tongue 105 moves within the space between magnets 100 and 101. The magnetic field of one of these magnets is reinforced, whereas that of the other magnet is concomitantly weakened, and vice versa.

In consequent thereof the Wheatstone bridge is unbalanced. The current fluctuations are conducted through two conductors 110 and 111 via rectifiers 112 and 113 and a tube amplifier 114 to two direct current magnets 115 and 116. These magnets have windings that are reversely wound so that their magnetic fields compensate each other if the currents which the windings carry have equal values. Said magnets surround a further electromagnet 117 into which projects a control slide valve 118 in the manner of a core which is pulled from right to left by action of a spring 119. The casing 120 of the control slide valve is provided with three apertures, namely, an aperture 121 for the supply flow from the pressure oil reservoir, an aperture for communication with the pressure cylinder, and a discharge aperture 123 from the oil reservoir. When the control slide valve is in median position, the valve portion 124 shuts the inflow of pressure oil as well as the outflow of said oil into the oil reservoir, i. e. the pressure plunger remains locked. The median position of the control slide valve is adjusted by means of the above-mentioned electromagnet 117, the magnet field of which opposes the action of the spring 119. The bridge of the field is tuned by means of a rheostat 125.

The regulating operation takes place in such manner that as the clamping element 7 shifts upwardly relative to the reference plate 14 the fields of the electromagnets 115 and 116 weaken the force of attraction of the magnet 117. The spring 119 attracts the control slide valve 118 towards the left-hand side so that the latter stops the supply of oil and institutes the discharge from the cylinder into the oil reservoir until the desired initial position of the clamping element is re-established. At this moment the control slide valve has reassumed its median position again.

If the clamping element 7 should shift relative to its previous position into a lower position, the magnetic fields of the magnets 115 and 116 increase the force of attraction of the magnet 117 which then shifts the control slide valve 118 towards the right-hand side by overcoming the spring force of the spring 119. The supply of pressure oil is then given free passage by said slide valve until the clamping element arrives in the required position again.

Four such control devices are correlated to each clamping element.

Figs. 9 and 10 represent schematic illustrations of a readily movable thrust transmission means which is constructed for transmitting the pressure exerted by the plunger 3 to the press plate 7 substantially free from friction. The central portion of the thrust transmission means is provided with terminal cylindrical surface portions of a diameter $D_1$ and abuts by means of pressure bodies 63, 64 which are provided with cylindrical surface portions of a diameter $D_2$ against plane plates 65 and 66. The individual parts are relatively guided by means of appropriate members, for example, guide pins 67. The axes of the cylinders $D_1$ and $D_2$ pass through the longitudinal centre line at right angles to each other. By virtue of this arrangement the thrust transmission means is adapted to tilt in all directions by rolling motion. The relatively great dimension of the diameters $D_1$ and $D_2$ reduces the specific pressure upon the cylindrical surfaces and the rolling faces thereof, as well as the resistance opposed by the thrust transmission means to readjustment to a minimum.

In Fig. 11 the construction of a readily movable hydraulically relieved thrust transmission means 68 is schematically illustrated. Said thrust transmission means is provided at both of its ends with annular cylindrical surfaces 69 and 70 which interengage with cylindrical chambers 71 and 72 respectively of the pressure plunger 3 and the press plate 7 respectively. Along the equator of the annular cylindrical surfaces seating rings 73 and 74 respectively are arranged. In the position of rest the pressure plate 7 bears against the pressure plunger 3 by means of calottes 75, 76. The ball valves 77 are thus lifted by pins 78 and the chambers 71 and 72 are connected with each other through a bore 79. If oil is then supplied through a pipe 80 from the pressure oil reservoir 19 (Fig. 1), the pressure of which is much greater than that acting on the plunger 3, at a sufficiently high pressure full load transmissive oil cushions are produced between the thrust transmission means 68 and the pressure plate 7 on one hand and the pressure plunger 3 on other. The thickness of the oil cushions is limited by the ball valves which keep that thickness constant. Such hydraulically relieved thrust transmission means are adapted to perform movements that are practically free from frictional resistance.

In practice the maximum angle of inclination of the clamping elements does in most cases not exceed 4° so that on the whole the simple mode of guiding by means of wheels 9 as shown in Fig. 1 comes up to requirements.

In Figs. 12 and 13 a construction for the lateral guidance of the clamping element 7 at greater angles of inclination is shown. The pressure plate 7 is provided at all four corners with relatively perpendicularly disposed cylindrically embossed pressure pieces 90, 91 that are arranged perpendicularly to each other and the cylinder axes of which intersect with the axis of the machine on one hand and are situated on other in the plane passing through the centre of the spherical heads of the thrust transmission means 70 (Fig. 11).

The pressure pieces 90 and 91 transmit transverse forces which may set up by means of turntables 92 and axial ball bearings 93 to two-wheel trucks 94 the rollers 96 of which move in grooves formed in screw posts 10 and 11 respectively free from friction. Spherical studs 95 slide in cylindrical bores in the pressure pieces 90 or 91 and serve as driving members for the truck.

By combining the capability of the pressure pieces 90 or 91 to roll with that of rotating of the turntables 92 perfect transverse guidance of the plate 7 is obtained even for greater inclinations.

I claim:

1. In apparatus for adjusting the test piece engagement face of the clamping elements of a hydraulically operated strength testing machine, clamping elements for the test piece supported in the machine, at least three pressure plungers coordinated with one of said clamping elements, cylinders in which the respective pressure plungers are located, thrust transmission means substantially free from friction interposed between each of said pressure plungers and said clamping element, means for supplying fluid pressure medium to each of said pressure plungers, means for controlling the supply of fluid pressure medium to said pressure plungers in dependence on the inclination of said clamping element to a reference plane, means providing a reference plane constantly perpendicular to the direction of movement of the clamping element, means to guide said clamping element transversely to its path of movement, means for determining the direction of inclination of the clamping element in accordance with the test to be carried out irrespective of the relative positions of the testing load engaging portion of the test piece and the machine axis, means for adding the pressures in said cylinders, and means for measuring the resulting pressure of said cylinder pressures.

2. In apparatus for adjusting the test piece engagement face of the clamping elements of a hydraulically operated strength testing machine, clamping elements for the test piece supported in the machine, at least three pressure plungers coordinated with each of more than one of said clamping elements, cylinders in which the respective pressure plungers are located, thrust transmission means substantially free from friction interposed between each of said pressure plungers and the clamping element they are coordinated with, means for supplying fluid pressure medium to said pressure plungers, means for controlling the supply of fluid pressure medium to said pressure plungers in dependence on the inclination of said clamping elements to coordinated reference planes, means providing reference plane coordinated with each of said clamping elements, constantly perpendicular to the direction of movement of said clamping elements, means to guide said clamping elements transversely to their path of movement, means for determining the direction of inclination of the clamping elements in accordance with the test to be carried out, irrespective of the relative positions of the testing load engaging portion of the test piece and the machine axis, means for adding the pressures in said cylinders, and means for measuring the resulting pressure of said cylinder pressures.

3. In apparatus for adjusting the test piece engagement face of the clamping elements of a hydraulically operated strength testing machine, clamping elements for the test piece supported in the machine, a central adjusting plunger disposed in the major axis of the machine, a reference plate rigidly fixed to said adjusting plunger, at least three pressure plungers coordinated with one of said clamping elements and grouped symmetrically about said adjusting plunger, cylinders in which the respective pressure plungers are located, thrust transmission means substantially free from friction interposed between each of said pressure plungers and said clamping element, means for supplying fluid pressure medium to said adjusting plunger and each of said pressure plungers, means for controlling the supply of fluid pressure medium to said adjusting plunger, means for controlling the supply of fluid pressure medium to each of said pressure plungers in dependence on the inclination of said clamping element to said reference plate, branch conduits to interconnect said pressure plungers, means for limiting the inclination of said clamping element, electrically driven mechanical means for determining the direction of inclination of the clamping element in accordance with the test to be carried out irrespective of the relative positions of the testing load engaging portions of the test piece and the machine axis, means to guide said clamping element substantially free from friction transversely to its path of movement, means for adding the pressures in said cylinders, and means for measuring the resulting pressure of said cylinder pressures.

4. In apparatus for adjusting the test piece engagement face of the clamping elements of a hydraulically operated strength testing machine, clamping elements for the test piece supported in the machine, a central adjusting plunger disposed in the major axis of the machine, a reference plate rigidly fixed to said adjusting plunger, at least three pressure plungers coordinated with one of said clamping elements and grouped symmetrically about said adjusting plunger, cylinders in which the respective pressure plungers are located, thrust transmission means substantially free from friction interposed between each of said pressure plungers and said clamping element, means for supplying fluid pressure medium to said adjusting plunger and each of said pressure plungers, means to control the supply of fluid pressure medium to said adjusting plunger, means to control the supply of fluid pressure medium to each of said pressure plungers in dependence on the inclination of said clamping element to said reference plate, branch conduits to interconnect said pressure plungers, means for limiting the inclination of said clamping element by valves controlling the flow of fluid pressure medium in said branch conduits, said valves being actuated by retractile spring means, and electromagnetically controlled spring catches in cooperation with arresting means provided on the actuating members of said valves, electrical means operating on the inductive principle for determining the direction of inclination of the clamping element in accordance with the test to be carried out irrespective of the relative positions of the testing load engaging portions of the test piece and the machine axis, means for adding the pressures in said cylinders, and means for measuring the resulting pressure of said cylinder pressures.

5. In apparatus for adjusting the test piece engagement face of the clamping elements of a hydraulically operated strength testing machine, clamping elements for the test piece supported in the machine, at least three pressure plungers coordinated with one of said clamping elements, cylinders in which the respective pressure plungers are located, thrust transmission means substantially free from friction interposed between each of said pressure plungers and said clamping element, means for supplying fluid pressure medium to each of said pressure plungers, means for controlling the supply of fluid pressure medium to said pressure plungers in dependence on the inclination of said clamping element to another clamping element of the machine in accordance with the test to be carried out irrespective of the relative positions of the testing load engaging portions of the test piece and the machine axis, means for adding the pressures in said cylinders, and means for measuring the resulting pressure of said cylinder pressures.

PAUL KRATZER.

REFERENCES CITED

The following references are of record in the file of this patent:

UNITED STATES PATENTS

| Number | Name | Date |
|---|---|---|
| 1,768,512 | De Leeuw | June 24, 1930 |
| 1,865,070 | Amsler | June 28, 1932 |
| 2,346,281 | Templin | Apr. 11, 1944 |

FOREIGN PATENTS

| Number | Country | Date |
|---|---|---|
| 23,145 | Great Britain | 1906 |